United States Statutory Invention Registration [19]

[11] Reg. Number: H123

Wright, Jr. [45] Published: Sep. 2, 1986

[54] SELF-SWITCHING ELECTROMAGNETIC LAUNCHER FOR REPETITIVE OPERATION

[75] Inventor: William H. Wright, Jr., Neptune, N.J.

[73] Assignee: The United States of America as represented by the Secretary of the Army, Washington, D.C.

[21] Appl. No.: 841,082

[22] Filed: Feb. 24, 1986

[51] Int. Cl.[4] ..... F41F 1/02

[52] U.S. Cl. ..... 89/8; 124/3; 310/12

*Primary Examiner*—David H. Brown
*Assistant Examiner*—John E. Griffiths
*Attorney, Agent, or Firm*—Anthony T. Lane; Harold H. Card, Jr.; Michael C. Sachs

[57] ABSTRACT

The invention concerns an EM Launcher wherein each projectile has an insulator which, when subjected to a breakdown voltage, allows current conduction through the EM rails and the projectile for acceleration thereof. The insulator thus provides a disposable switch for a rapid fire EM launcher, negating the necessity of electrical (inductor circuit) charging or mechanical (breech) recycling.

A key element in the invention is the replacing of a repetitively operated external switch with a plurality of single-shot, disposable switches. Better performance can be obtained from a single-shot switch (i.e., lower inductance, lower on-state voltage drop) because the compromises required of a repetitive switch to enable it to recover its voltage holdoff are not necessary.

19 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF-SWITCHING ELECTROMAGNETIC LAUNCHER FOR REPETITIVE OPERATION

GOVERNMENTAL INTEREST

The invention described herein may be made, used, or licensed by the Government for Govenmental purposes without the payment to me of any royalties thereon or therefor.

BACKGROUND OF THE INVENTION

The invention concerns a self-switching means for repetitively operating an electromagnetic launcher.

Electromagnetic launchers, such as rail guns and coaxial launchers are well known, and were the major subject of publication in the IEEE Transactions on Magnetics, Volume MAG-20, No. 2, March 1984, containing several individually authored articles discussed below. Kolm et al, for example, discusses in "Basic Principles of Coaxial Launch Technology" the advantages of coaxial launches, in that no physical contact with the projectile occurs, coaxial launches develop thrust over the length of the projectile, and for a given current, may yield a thrust of 100 times higher than that of a rail gun. However, the current must be synchronized with projectile motion and the voltage required increases with desired velocity. Kolm et al. point out that present research is directly almost entirely towards rail guns because they are simpler.

A basic rail gun is disclosed in "Switching for Electric Rail Guns" Barber et al. Here, a commutation switch is located at the breech of a rail gun, which is normally closed to permit the charging of an inductive energy store by a power supply. Once charging is complete, the switch is opened and current is commutated into the gun. When the projectile leaves the muzzle, the switch is closed to permit recharging of the inductor. Accordingly to Barber et al. the critical parameters are voltage recovery rate and maximum stand-off voltage. The voltage recovery rate must exceed the rate at which the railgun develops voltage.

In an effort to determine the computation of force occurring on a railgun projectile, Marshall analyzes "The Current Flow Patterns in Rail Gun Rails." Woodson discusses in "Switching Overview-Fundamental Issues" the importance of a railgun switching system. Accordingly to Woodson, time is critical regarding: how long the switchng system must carry current before switching operation occurs, how fast current is to be transferred from the switch to the load, and how fast and high the load voltage will rise.

Another time consideration is whether the switch will be single shot or repeated. Sze et al. developed a magnetically actuated switch utilizing butt contacts which permits higher current densities. Magnetic forces are used to separate the contacts. Sze et al.'s device is disclosed in their article, "Design and Testing of a Magnetically Operated Rep-rate Opening Switch." A rod array triggered vacuum gap switch is proposed by Honig in "Switching Considerations and New Transfer Circuits for Electromagnetic Launch Systems," wherein it is recognized that resistive transfer circuits require that an opening switch dissipate energy associated with load inductance and with its own inductance.

A metal, vapor vacuum arc switch was proposed by Cope et al. for a typical EM Launcher in "Metal Vapor Vacuum Arc Switching: Applications and Results." "A Coaxial Radial Opening Switch for a Distributed-Energy-Store Rail Launcher" was present by Upshall et al. in an attempt to overcome the difficulties associated with switching. Many of these articles address the realization that switchng is the critical, limiting step, in achieving rapid fire with EM Launchers. However, the authors have only proposed, at most, variations on a theme of mechanical switches, each being limited by its own operation and recycle times.

The energy efficiency of the normal rail gun, as defined by the ratio of energy in the projectile to energy lost from the energy store, is inherently low because a large amount of energy is transferred to the various inductances in the circuit and all of the energy must be dissipated (wastefully) after the projectile being accelerated (PBA) is launched. By launching multiple projectiles, as above, without requiring that the current flow cease between them, the energy stored in the stray inductances is dissipated only once rather than for each projectile. Hence there is potential for greatly increased energy efficiency.

SUMMARY OF THE INVENTION

The invention concerns a means for self-switching an electromagnetic launcher for rapid repetitive operation.

Each projectile in a magazine is provided with an insulator that also functions as a switch. A single projectile with its insulator falls into the breech of a railgun and a breakdown voltage is applied in an amount which causes breakdown of the insulation. The projectile thus becomes conducting and travels through the barrel and out the muzzle of a railgun.

As the projectile leaves the muzzle, a break occurs in the conductive path occurring between the rails, and the voltage between the rails increases because of the rail inductance. The increased voltage now occurring between the rails causes the breakdown of an insulator associated with a subsequent projectile. Thus, an alternating stack of projectiles and insulators is fed into the breech, the insulators also functioning as switches in response to the occurrence of a breakdown voltage.

In accordance with the present invention no resetting or recycling of a mechanical or electrical device is necessary. For instance, the cycling of a mechanical breech is not employed, nor is the cessation or dissipation of current flow necessary in the biasing circuit. The technology may apply to rail guns or coaxial guns.

An alternate embodiment would include a high voltage triggered generator connected between the rails of a railgun. The application of a low energy, high voltage pulse by the trigger generator would breakdown an insulator of a single projectile and cause the subsequent firing of the projectile. A timing means may be included to eliminate muzzle flash to vary the range for any individual shot or the repetition rate occurring during a burst.

According, one of the objects of this invention is to provide an EM launcher wherein each projectile has an insulator, which, when subjected to a breakdown voltage, allows current conduction through the EM rails and the projectile for acceleration thereof.

Another object of this invention is to provide an insulator which is a disposable switch for a rapid fire of an EM launcher, and which negates the necessity of electrical charging or mechanical recycling.

Still another object of the invention is the replacing of a repetitively operated external switch with a plurality of single shot, disposable switches.

DETAILED DESCRIPTION OF THE INVENTION

Figure 1:
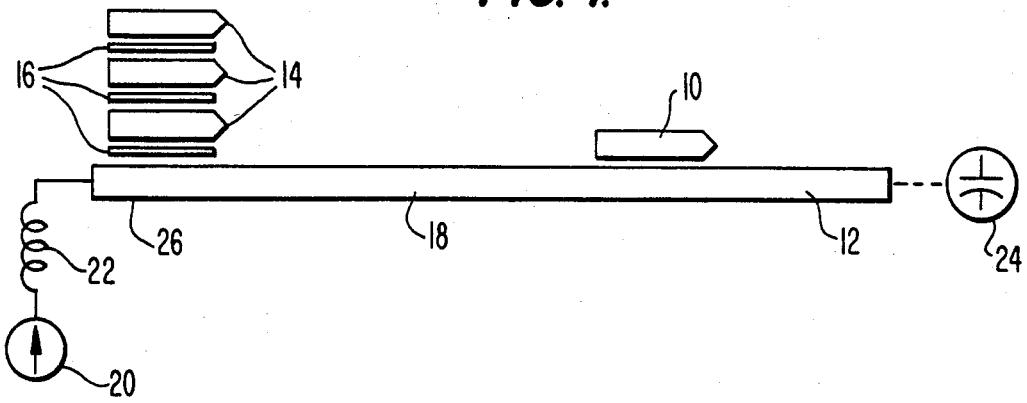
FIG. 1 shows a rail launcher being fed a series of projectiles separated by insulator/switches.

The invention involves a means for self-switching an electromagnetic launcher for rapid repetitive operation. Various constructions using such means are possible, one of which is shown in FIG. 1 (side view). In accordance with the invention, one projectile 10 is accelerated toward the muzzle 12 and a stack of projectiles 14, separated by switches 16 are supplied at the breech end 26. The rails 18 are fed by a current source 20 with some inductance 22 in series with the source 20 and the rails 18. (A voltage source with series impedance would work in the manner discussed by Barber et al.)

A voltage between the rails 18 is low, such that the projectile being accelerated (PBA) presents a low impedance path for current flowing in opposite directions in the two rails 18. As the PBA 10 leaves the muzzle 12 an arc is formed and the rail-to-rail voltage increases because of the decreasing current in the inductive circuit (L di/dt, or inductive "Kick"). When the breakdown voltage of the switch 16 (or insulating layer) between the rails 18 and the bottom projectile 14 at the breech end 26 is reached, a current path is formed to that projectile 14 (i.e., a circuit path is closed in the manne of a switch) which is now accelerated.

THe remainder of the projectiles 14 are stacked to be advanced toward the rails 18 (by a spring force, for example) and the process repeats without any switching or other control being required in the external circuit. For example the current in inductor 22 need not be depleted before a next projectile is accelerated. The insulating layer 16 could be dragged along with the PBA and, now electrically broken-down, expelled from the muzzle, or vaporized by the arc or internal friction. Should the insulating layer 16 fail to eject, since it has broken-down electrically and is conductive it would not prevent the next switch from closing. That is, the next insulating layer 16 would be subjected to a breakdown voltage, and its associated projectile would be accelerated.

A capacitor 24 could be connected across the muzzle 12 of the rails to act as a current sink as the PBA 10 exits the muzzle 12 to reduce muzzle flash. In this case the rail-to-rail voltage would rise as the capacitor 12 accepted charge, the next switch would close (next insulating layer 16 would break down) and the capacitor 24 would discharge through the next PBA. The insulating layers 16 in the stack above the projectile nearest the rails 18 are in a field-free region between conducting surfaces and are, in this location, in no danger of being electrically broken down. The inherent capacitive grading of the segmented structure also reduces electrical stress on these layers 16.

Figure 2:
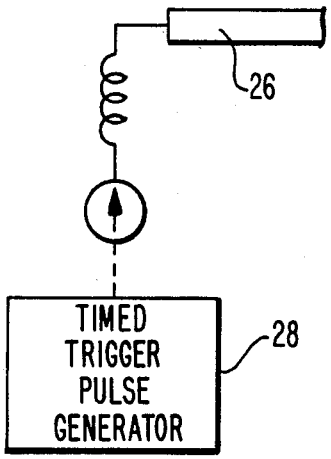
FIG. 2 shows a rail gun which is controlled by a timed-pulse trigger generator.

A second embodiment is shown in FIG. 2, where a low-energy, high-voltage externally controllable trigger generator 28 is located between the rails 18 at the breech end 26. Initiating a high voltage pulse with the trigger generator 28 would break down the bottrom insulating layer 16, because the inductance in the rails 18 would isolate this trigger pulse from the shorting effect caused by the PBA, 10. Rail current would divert the next PBA because a voltage drop along the rails.

This effect could be varied by changing the attachment point of the trigger generator 28 from the current source 20 to the rails 18. The high voltage trigge could be timed to coincide with the PBA 10 exiting the muzzle 12, to eliminate muzzle flash, or timed to occur earlier, diverting current from the PBA near the muzzle to the next PBA in the breech, in which case the final velocity of the PBA 10, and hence its range, could be varied at will, shot-to-shot if desired.

With external triggering, the inductance of the external circuit could be reduced or the value of the muzzle capacitor 24 increased in which case the disposable switch 16 (insulating layer) would hold off the source voltage until triggered and the repetition rate could be lowered by delaying the trigger pulse. Circuit values, inductance and capacitance, could be adjusted such that energy would ring back and fourth, and the next trigger signal could be timed to optimize recovery of energy stored in the inductances.

If very large values of capacitance are required, a rotating DC machine whose electrical characteristics are similar to those of a capacitor (motor-generator, homopolar device, etc.) could be used as a capacitor. Another advantage of the externally triggered device is that as the energy store is depleted with multiple shots the timing of the trigger pulses could be delayed progressively so that each succeeding shot is accelerated along a longer distance on the rails 18, and all projectiles 14 would merge with the same velocity.

The invention may be used with a low inductance voltage source having an internal characteristic impedance, such as PFN, because much of the source voltage is dropped across the internal impedance while the projectile 10 is conducting current. As the projectile 10 leaves the rails 18 and current is reduced, the rail-to-rail voltage will rise toward the source voltage, breaking down the bottom insulating layer 16.

The time for acceleratin of the PBA 10 is typically a few milliseconds. Thus, where the voltage rise associated with the projectile leaving the muzzle 12 initiates the switching action, repetition frequencies of a few hundred or a thousand per second are possible. With external triggering of the disposable switches 16 (insulating layes), the repetition rate could be increased (multiple projectiles moving on the rails simultaneously) or reduced by allowing the stored energy to resonate in a low-loss circuit and delaying the trigger signal. Varying rail impedance, for example or making the muzzle ends resistive, can assist the transfer of current from the PBA 10, as it exits, to the next PBA and to dissipate the energy remaining in the circuit after the last projectile has been fired.

Figure 3:
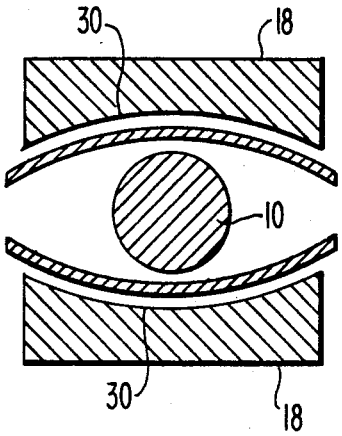
FIG. 3 shows another embodiment of an electromagnetic launcher in accordance with the present invention.
Figure 4:
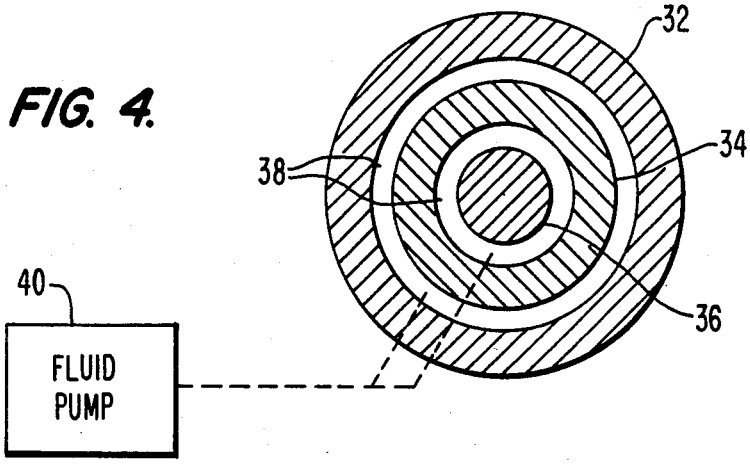
FIG. 4 shows an additional embodiment of an electromagnetic launcher incorporating the present invention.

The above description has addressed only rail geometry. However the concept of disposabe switch (electrically broken insulating layer) can be applied to other geometries as well. FIGS. 3 and 4 show such modifications. In FIG. 3, two rails 18 are shown having concave surfaces 30, between which the PBA 10 travels. Bowed insulating layers 16 electically separate the PBA 10 from the current conducting rails 18. As with the FIG. 1 and 2 embodiments, the projectile is accelerated once the insulating layers, or switches, 16 are subjected to a break down voltage. FIG. 4 depicts the use of disposable switches in a coaxial EM gun. Here, a first conductor 32 surrounds a hollow projectile 34, which in turn, surrounds a second, cylindrical conductor 36. Two insulating layers 38, electrically separate the projectile 34 from the coaxial conductors 32, 36 until the breakdown voltage occurs, to accelerate the projectile 34. The insulating layers described need not be of solid material; an accurately maintained layer of liquid or gaseous insulator may be pumped between the projectile 34 and the conductors 32, 36 by fluid supply 40. While two insulating layers 38 may be used, only one is necessary since PBA may be in electrical contact with one rail or surface.

The potential repetition rate (firing rate) can be much higher than for gas-fired (explosive) launchers because there is no reciprocating mass (for example, the breech block) involved. The electrical effects at the muzzle or the timing of the trigger pulse, rather than the positioning of the next projectile into the breech, initiates the next launching event. Therefore the stack of projectiles can be advanced smoothly rather than in a start-stop manner. A potential advantage of the externally high firing rate, especially for supersonic projectile velocities, is the increase in range for a given launch energy when a projectile is launched through a "hole" in the atmosphere left by the proceeding projectile before the surrounding gas can refill that space. The reduce air drag could offset (partially or fully) the reduction of launch velocity as the energy store is depleted.

If desired to reduce the firing rate without interrupting current flow, a capacitor could be connected across the breech end of the rails to accept the charge from the flowing current and store it until the next projectile is triggered. Conceptually a diode and switch could be used to temporarily store this energy. The advantage of the invention is the provision of a disposable switch, one or more per projectile, which enables repetitive operations of an EM launcher without requiring repetitive operation of an electrical or mechanical switch. Other modifications are apparent to one skilled in the art which would not depart from the spirit and scope of the present invention as defined by the appended claims. For instance, the insulating layers could be separate pieces or one continuous piece. A cylindrical sleeve of insulation could be used to mechanically align and/or restrain the magazine of projectiles.

What is claimed is:

1. An electromagnetic launcher means having a breech and muzzle, a projectile with an insulating means, and having an energy source means for generating a break-down voltage to the insulating means.

2. An electromagnetic launcher means as in claim 1, the insulating means comprising a solid insulating layer.

3. An electromagnetic launcher means as in claim 2, having a series of projectiles which are separated from one another by a series of corresponding insulating layers.

4. An electromagnetic launcher means as in claim 3, the energy source means comprising a current source means connected to the electromagnetic launcher means for generating current.

5. An electromagnetic launcher means as in claim 4, the energy source means comprising an inductive means connected to the current source means, for storing current from the current source means.

6. An electromagnetic launcher means as in claim 5, including a trigger means for generating a voltage pulse which breaks down the insulating layers.

7. An electromagnetic launcher means as in claim 6, having rails including said breech and muzzle across which the voltage pulse is generated.

8. An electromagnetic launcher means as in claim 7, the rails having inner, concave surfaces facing one another, and between which the projectiles are accelerated.

9. An electromagnetic launcher means as in claim 8, one of the insulating layers being bowed, and positioned between at least one concave surface and one of the projectiles.

10. An electromagnetic launcher means as in claim 1, the insulating means comprising a fluid which is broken down by the energy source means.

11. An electromagnetic launcher means as in claim 10, having two coaxial conductors including said breech and muzzle.

12. An electromagnetic launcher means as in claim 11, a first of the two coaxial conductors being hollow and surrounding the projectile, the second beng surrounded by the projectile.

13. An electromagnetic launcher means as in claim 12, the conductors being electrically separated from the projectile by a fluid which is provided by a pumping means of the electromagnetic launcher means.

14. An electromagnetic launcher means as in claim 13, comprising a series of projectiles which are separated from one another by a series of corresponding insulating layers, and including a trigger means for generating a voltage pulse which breaks down the insulating layers.

15. An electromagnetic launcher means as in claim 10, having rails including said breech and muzzle across which the voltage pulse is generated.

16. An electromagnetic launcher means as in claim 15, the rails having inner, concave surfaces facing one another, and between which the projectiles are accelerated.

17. An electromagnetic launcher means as in claim 16, one of the insulating layers being bowed, and positioned between at least one concave surface and one of the projectiles.

18. An electromagnetic launcher means as in claim 17, the fluid comprising a gas.

19. An electromagnetic launcher means as in claim 17, the fluid comprising a liquid.

* * * * *